United States Patent
Wang

(10) Patent No.: US 6,629,683 B2
(45) Date of Patent: Oct. 7, 2003

(54) DRAINING-PREVENTING DEVICE OF PNEUMATIC-AND-ELECTROMOTIVE DRIVING VALVE

(76) Inventor: Zi-Ren Wang, 235 Chung - Ho, Box 8-24, Taipei (TW)

(*) Notice: Subject to any disclaimer, the term of this patent is extended or adjusted under 35 U.S.C. 154(b) by 32 days.

(21) Appl. No.: 10/038,477

(22) Filed: Jan. 7, 2002

(65) Prior Publication Data

US 2003/0127619 A1 Jul. 10, 2003

(51) Int. Cl.$^7$ ............................................. F16K 5/06
(52) U.S. Cl. ................ 251/315.1; 251/214; 251/315.01
(58) Field of Search ................................. 251/213–280, 251/304–317.01

(56) References Cited

U.S. PATENT DOCUMENTS

| | | | | |
|---|---|---|---|---|
| 3,981,482 A | * | 9/1976 | Callahan, Jr. | 251/315.13 |
| 4,175,580 A | * | 11/1979 | Kalbfleisch | 251/315.13 |
| 4,230,154 A | * | 10/1980 | Kalbfleish | 251/307 |
| 4,714,235 A | * | 12/1987 | Brown et al. | 251/252 |
| 5,064,167 A | * | 11/1991 | DiPalma | 251/214 |
| 5,634,486 A | * | 6/1997 | Hatting et al. | 251/214 |
| 6,138,987 A | * | 10/2000 | Lee | 251/315.14 |

* cited by examiner

*Primary Examiner*—Paul J. Hirsch

(57) ABSTRACT

A draining-preventing device of a pneumatic-and-electromotive driving valve is disclosed. A driving shaft is installed at a center of a receiving tube of a joint and a lower end of the joint is buckled with a ball valve. The driving shaft and the ball valve rotates synchronously with the pneumatic-and-electromotive driving valve. A tightening sleeve is locked between the receiving tube and the driving shaft. A top surface of the tightening sleeve has an adjusting nut and the adjusting nut has a plurality of adjusting holes. When the draining-preventing washer becomes hard or deforms, so that that the force of the tightening sleeve is insufficient, and therefore, a gap is formed between the tightening sleeve and the joint. Thus water can be stop completely. Furthermore, by a supporting frame, a tray is supported at two sides and other portion is hollowed. If water drains out, it can be known immediately.

1 Claim, 4 Drawing Sheets

DRAINING-PREVENTING DEVICE OF PNEUMATIC-AND-ELECTROMOTIVE DRIVING VALVE

BACKGROUND OF THE INVENTION

1. Field of the Invention

The present invention relates to draining-preventing devices, and particularly to a draining-preventing device of a pneumatic-and-electromotive driving valve, wherein when the tightness force is insufficient, a tightening sleeve can be adjusted directly to press a draining-preventing washer. Thereby, water can be stopped completely.

2. Description of the Related Art

When a prior art joint of a tube is used for a longer time, the draining-preventing washer P is easy to deform or become hard so that the tightening force between the washer P and the joint is insufficient. Thereby, water cannot be stopped completely. Furthermore, the part of the draining-preventing washer must be adjusted so that the draining-preventing washer can press the joint again to achieve the effect of stopping water.

FIG. 1 shows a conventional joint 5, a receiving tube 51 vertically extends from the joint and a periphery of the receiving tube 51 is extended with a supporting frame 52. A top of the supporting frame 52 has a horizontal tray 521 for supporting a pneumatic-and-electromotive driving valve 3. A center of the receiving tube 51 is inserted by a driving shaft 53. The top of the driving shaft 53 is engaged with the pneumatic-and-electromotive driving valve 3 and a lower end thereof is buckled to a ball valve Q. Thereby, the pneumatic-and-electromotive driving valve 3 can drive the driving shaft 52 to rotate with the ball valve Q synchronously. A tightening sleeve 54 is locked between the driving shaft 53 and the receiving tube 51. A lower end of the tightening sleeve 54 resists against a draining-preventing washer P so as to achieve the object of drain-preventing.

However, the prior art joint is inconvenient in operation since the joint 5 has a supporting frame 52 which extends from the whole periphery of the receiving tube 51 so as to form an a whole enclosed circle. A top of the supporting frame 52 is locked with the pneumatic-and-electromotive driving valve. When the draining-preventing washer P becomes hard or deforms, the tightness between the tightening sleeve 54 and the draining-preventing washer P must be adjusted. Because the supporting frame 52 is a whole circle, the pneumatic-and-electromotive driving valve 3 must be taken down to expose the tightening sleeve 54. Then the tightening sleeve 54 is adjusted to press downwards the draining-preventing washer P. Thereby, the draining-preventing washer P and the joint 5 can be adhered completely. Thus water is stopped completely. However, the operation is inconvenient and since the pneumatic-and-electromotive driving valve must be detached so that much time is required.

Moreover, since the supporting frame 522 of the pneumatic-and-electromotive driving valve 3 has a shape of a whole circle, if water drain out, it can not be known by viewing the outer side thereof. This event is known until water drains out from the portion between the supporting frame and the pneumatic-and-electromotive driving valve. However, a long time period has elapsed and the parts are possibly rusted. Moreover, water possibly drains into the pneumatic-and-electromotive driving valve 3 so that short circuit occurs.

SUMMARY OF THE INVENTION

Accordingly, the primary object of the present invention is to provide a draining-preventing device of a pneumatic-and-electromotive driving valve, wherein a driving shaft is installed at a center of a receiving tube of a joint and a lower end of the joint is buckled with a ball valve. The driving shaft and the ball valve rotates synchronously with the pneumatic-and-electromotive driving valve. A tightening sleeve is locked between the receiving tube and the driving shaft. A top surface of the tightening sleeve has an adjusting nut and the adjusting nut has a plurality of adjusting holes. When the draining-preventing washer becomes hard or deform, so that that the force of the tightening sleeve is insufficient, and thus a gap is formed between the tightening sleeve and the joint, a hand tool can insert into the adjusting hole of the tightening sleeve to adjust the threaded surface, so that the so that draining-preventing washer and the joint are adhered completely. As a consequence, water can be stop completely. When the tightening sleeve moves downwards, the pneumatic-and-electromotive driving valve is unnecessary to be taken out from the top end of the joint. Thereby, it can be adjusted and operated conveniently.

Another object of the present invention is to provide a draining-preventing device of a pneumatic-and-electromotive driving valve, wherein by a supporting frame, a tray is supported at two sides of a supporting frame and other portion of the frame is hollowed. If water drains out, it can be known immediately and the parts can be detached and updated rapidly so as to avoid the waste of resource.

The various objects and advantages of the present invention will be more readily understood from the following detailed description when read in conjunction with the appended drawing.

DETAILED DESCRIPTION OF THE PREFERRED EMBODIMENTS

Figure 1:
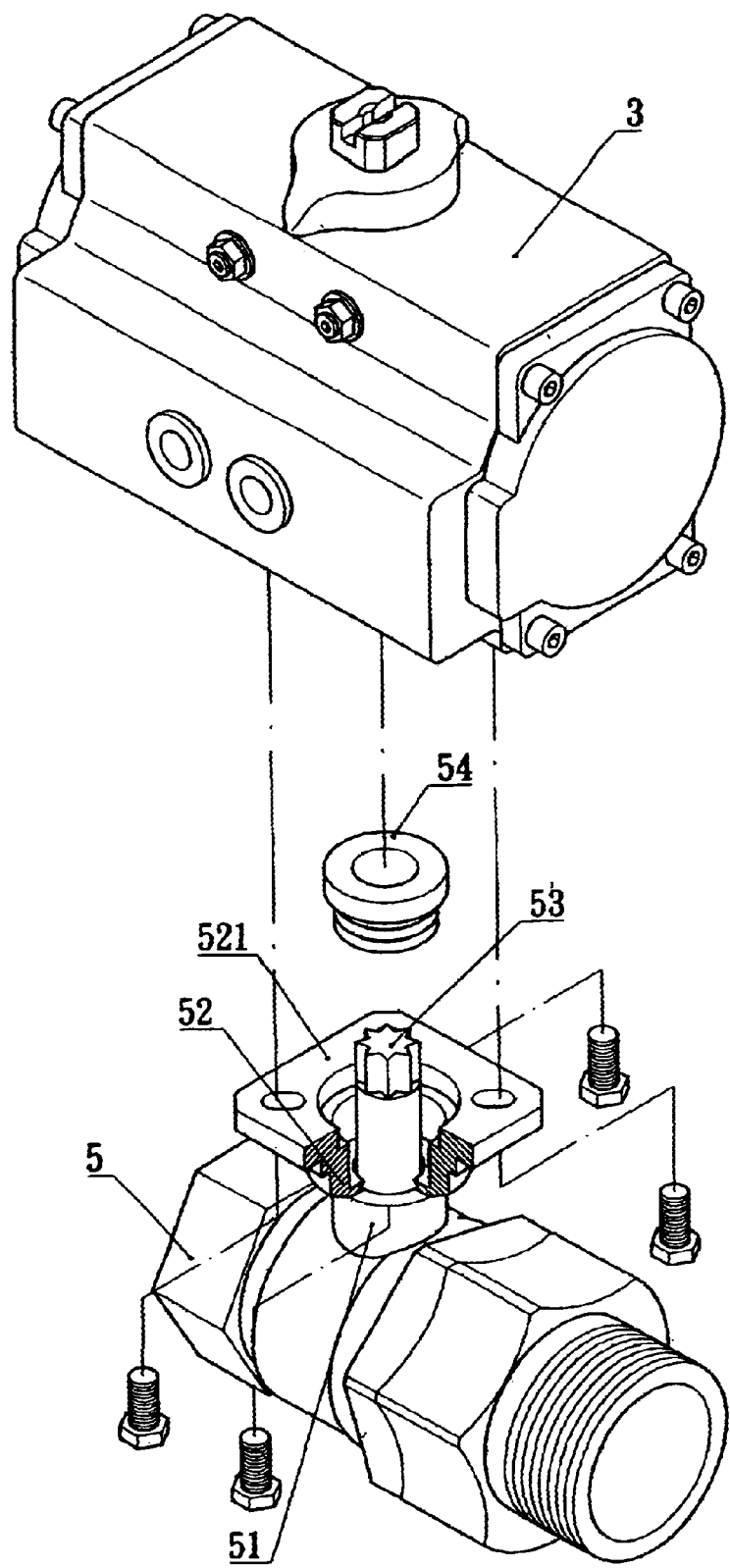
FIG. 1 is an exploded perspective view of a draining-preventing device of a joint of a prior joint.
Figure 2:
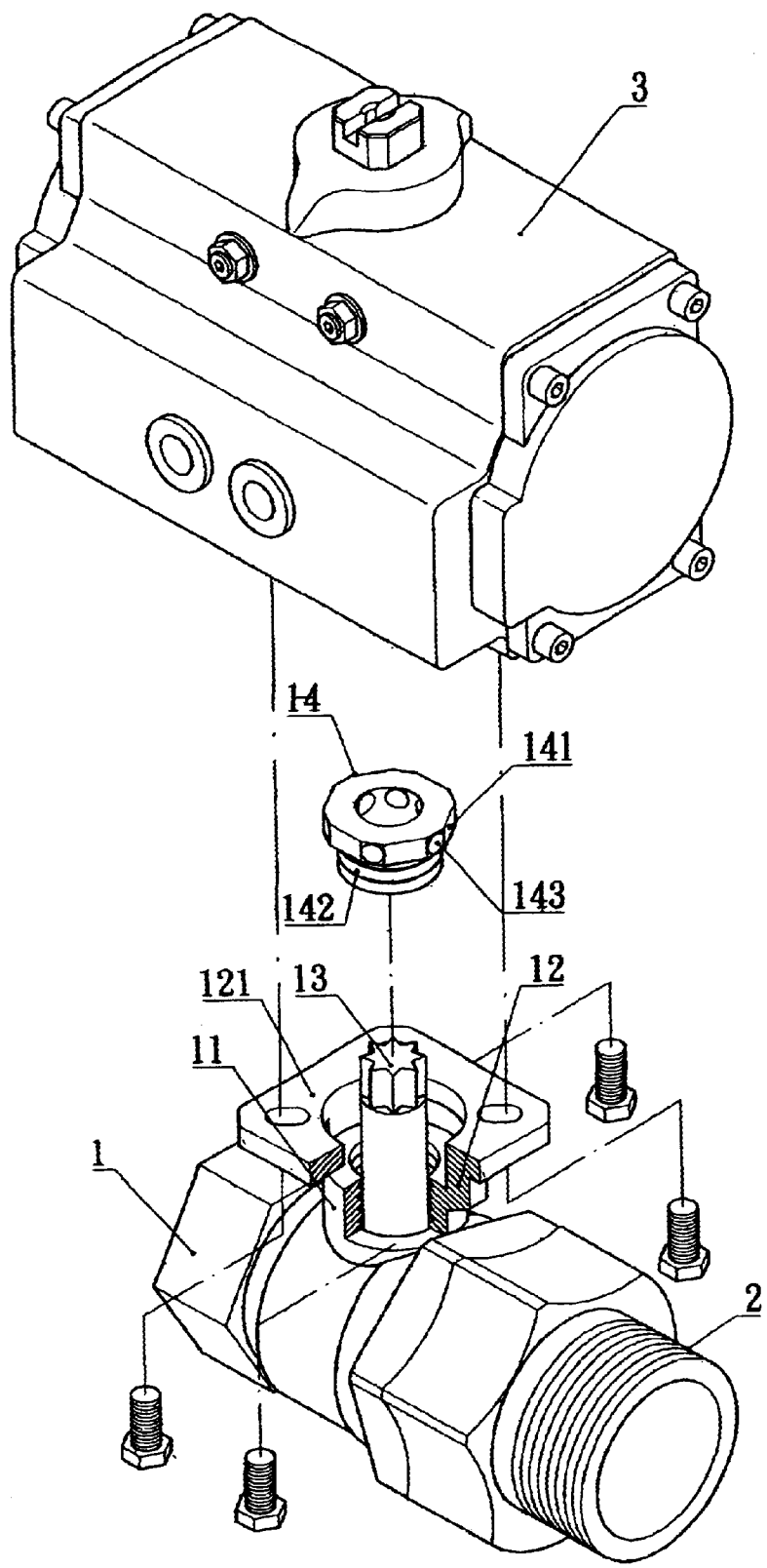
FIG. 2 is an exploded perspective view of a draining-preventing device of a joint of the present invention.
Figure 3:
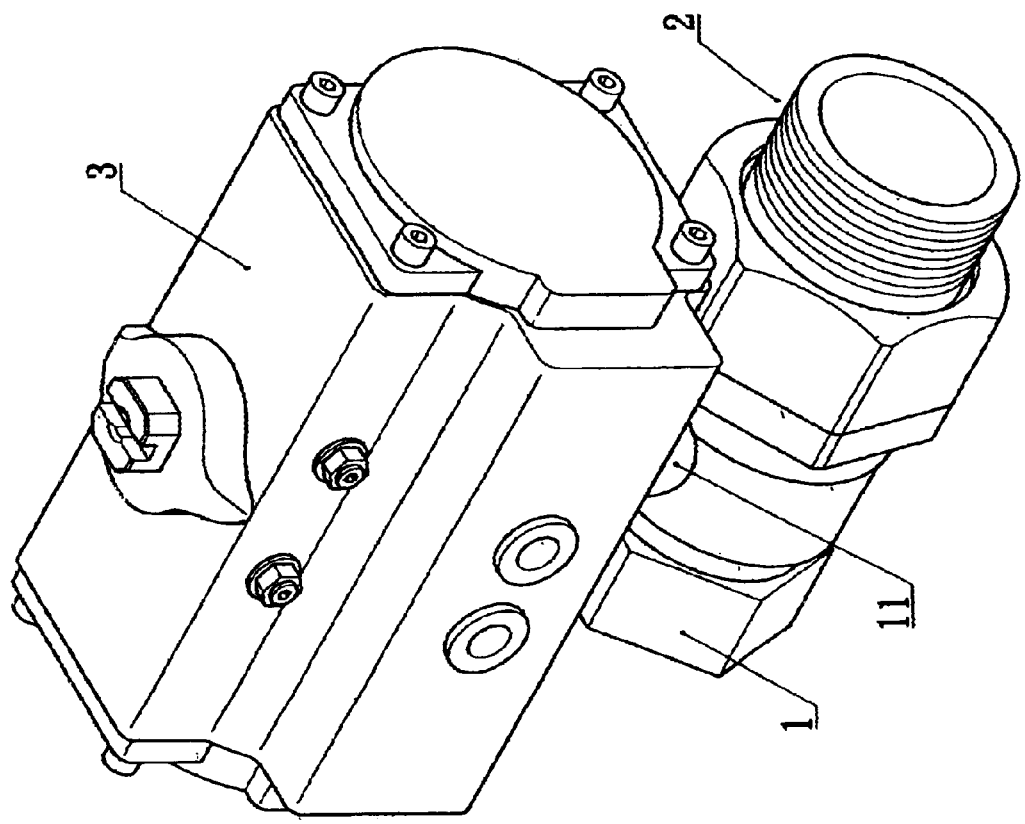
FIG. 3 is an assembled perspective view of the draining-preventing device of a joint of the present invention.

Referring to FIGS. 2 and 3, the draining-preventing device of the present invention is illustrated. The draining-preventing device mainly formed by a joint 1, a circular connecting tube 2 locked to the joint 1 a pneumatically-and-electromotive driving valve engaged to a top surface of the joint 1.

A predetermined portion of the joint 1 has a receiving tube 11 with a vertical inner ring which has a threaded surface 111. A supporting frame 12 extends upwards from two sides of the receiving tube 11. A top surface of the supporting frame 12 has a horizontal tray 121. Thereby, a top surface of the tray 121 can support and is locked with a pneumatic-and-electromotive driving valve 3. The center of the receiving tube 11 is inserted by a driving shaft 13. A tightening sleeve 14 is locked between the driving shaft 13 and the receiving tube 11. A lower end of the tightening sleeve 14 resists against a draining-preventing washer P.

A top of the driving shaft 13 is engaged with a bottom of the pneumatic-and-electromotive driving valve so that the driving shaft 13 can rotate synchronously with the pneumatic-and-electromotive driving valve. The lower end of the driving shaft 13 is buckled to a ball valve Q, thereby, driving the ball valve Q to rotate synchronously as the driving shaft 13 rotates.

The tightening sleeve 14 is a T shape tube. The tube and has a large ring having an adjusting nut 141 and a small ring 142 having a male thread. After the tightening sleeve 14 passes through the driving shaft 13, it is exactly locked to the threaded surface 111 of receiving tube 11. The adjusting nut 141 of the tightening sleeve 14 exposes to the outer side of the receiving tube 11, and the lower end of the small ring 142 presses against the upper end of the draining-preventing washer P for providing a well drain-proof function. The edge of the adjusting nut 141 at an outer side of the receiving tube 11 is installed with a plurality of adjusting holes 143. Therefore, after a hand tool passes through the adjusting hole 143, the tightening sleeve 14 is adjusted to press the draining-preventing washer P further.

Figure 4:
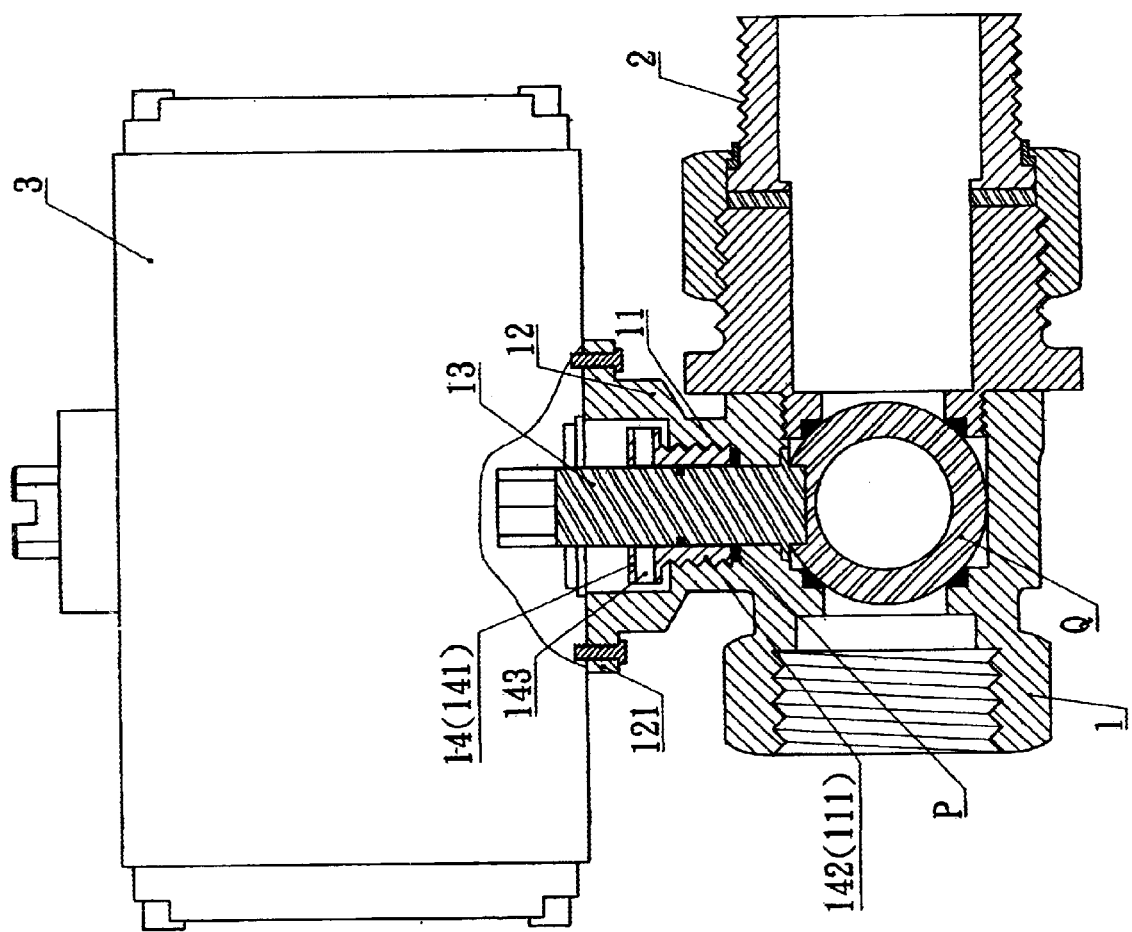
FIG. 4 is a plane cross sectional view of the present invention.

Referring to FIG. 4, an embodiment about the assembly of the present invention is illustrated. A predetermined portion of the joint 1 has a receiving tube 11 with a vertical inner ring which has threaded surface 111. A supporting frame 12 extends upwards from the side of the receiving tube 11. A top surface of the supporting frame 12 has a horizontal tray 121. Thereby, a top surface of the tray 121 can support a pneumatic-and-electromotive driving valve 3 and is suitable for the tightening sleeve 14 is located between the receiving tube 11 and the tray 121. The adjusting nut 141 protrudes out of the receiving tube 11. Furthermore, adjusting holes 143 are formed on the adjusting nut 141. When the draining-preventing washer P becomes hard or deform, so that that the force of the tightening sleeve 14 is insufficient, and thus a gap is formed between the tightening sleeve 14 and the joint 1, a hand tool can insert into the adjusting hole 143 of the tightening sleeve to adjust the threaded surface 11, so that the so that draining-preventing washer P and the joint 1 are adhered completely. As a consequence, water can be stop completely. When the tightening sleeve 14 moves downwards, the pneumatic-and-electromotive driving valve is unnecessary to be taken out from the top end of the joint 1. Thereby, it can be adjusted and operated conveniently.

By the supporting frame 12, the tray 121 is supported at two sides and other portion is hollowed. If water drains out, it can be known immediately and the parts can be detached and updated rapidly so as to avoid the waste of resource.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A draining-preventing device of a pneumatic-and-electromotive driving valve comprising a joint, a circular connecting tube locked to the joint, a pneumatically-and-electromotive driving valve engaged to a top surface of the joint;

the joint having a receiving tube with a vertical inner ring which has a threaded surface; a center of the receiving tube being inserted by a driving shaft; a tightening sleeve being locked between the driving shaft and the receiving tube; a lower end of the tightening sleeve resists against a draining-preventing washer; the driving shaft being engaged with the pneumatic-and-electromotive driving valve, and a lower end thereof resisting against a ball valve, thereby, causing the driving shaft and the ball valve to rotate with the operation of the pneumatic-and-electromotive driving valve; characterized in that:

a supporting frame extends upwards from two sides of the receiving tube while at other sides of the receiving tube, the supporting frame is hollowed; a top surface of the supporting frame has a horizontal tray; thereby, a top surface of the tray supports and is locked with the pneumatic-and-electromotive driving valve; a top surface of the tightening sleeve has an adjusting nut, and the adjusting nut protrudes out of an outer side of the receiving tube; and an outer edge of the tightening sleeve has a plurality of adjusting holes; and the adjusting nut of the tightening sleeve is adjustable by a hand tool so that the tightening sleeve presses the draining-preventing washer, thereby, no water will drain out.

* * * * *